United States Patent [19]
Forbord

[11] Patent Number: 5,991,124
[45] Date of Patent: Nov. 23, 1999

[54] ROTARY DISC DRIVE ACTUATOR UTILIZING PLURAL AXIALLY SPACED AND PARTIALLY OVERLAPPED VOICE COILS

[75] Inventor: Kent J. Forbord, St. Louis Park, Minn.

[73] Assignee: Seagate Technology, Inc., Scotts Valley, Calif.

[21] Appl. No.: 09/108,742

[22] Filed: Jul. 1, 1998

Related U.S. Application Data

[60] Provisional application No. 60/059,611, Sep. 23, 1997.

[51] Int. Cl.$^6$ ...................................................... G11B 5/54
[52] U.S. Cl. ............................................................ 360/106
[58] Field of Search .................................... 360/105, 106, 360/97.01, 98.01

[56] References Cited

U.S. PATENT DOCUMENTS

| | | | |
|---|---|---|---|
| 5,319,512 | 6/1994 | Grapenthin | 360/106 |
| 5,448,437 | 9/1995 | Katahara | 360/106 |
| 5,761,007 | 6/1998 | Price et al. | 360/106 |
| 5,764,441 | 6/1998 | Aruga et al. | 360/106 |
| 5,768,061 | 6/1998 | Casey et al. | 360/106 |

FOREIGN PATENT DOCUMENTS

| | | |
|---|---|---|
| 0 456 371 A2 | 4/1991 | European Pat. Off. . |
| 58-102367 | 6/1983 | Japan . |

*Primary Examiner*—Jefferson Evans
*Attorney, Agent, or Firm*—Westman, Champlin & Kelly

[57] ABSTRACT

An improved rotary actuator for supporting heads relative to a disc of a disc drive for operation. The rotary actuator includes an actuator block pivotally connected to a chassis of a disc drive. The actuator block includes an actuator arm for supporting heads. The actuator block supports a coil assembly adapted for operation in a magnetic field to form a voice coil motor. The coil assembly includes a plurality of wound coils supported by the actuator block at spaced elevations and having a portion of spaced coils overlapped to reduce the operating area for the voice coil motor. The geometry of the coils reduces off-track force excitation of the rigid body resonance to allow for high bandwidth servo. The coil assembly also reduces off-track force during settle in for improved seek times.

18 Claims, 9 Drawing Sheets

ROTARY DISC DRIVE ACTUATOR UTILIZING PLURAL AXIALLY SPACED AND PARTIALLY OVERLAPPED VOICE COILS

CROSS REFERENCE TO RELATED APPLICATIONS

The present application claims priority to Provisional Application Ser. No. 60/059,611, filed Sep. 23, 1997 abandoned, and entitled "HIGH BANDWIDTH ROTARY ACTUATOR DESIGN."

FIELD OF THE INVENTION

The present invention relates to a rotary-type actuated disc drive. In particular, the present invention relates to an improved rotary actuator assembly for a disc drive.

BACKGROUND OF THE INVENTION

Rotary-type disc drives are well-known which include an actuator block rotationally coupled to a chassis of a disc drive for supporting a plurality of heads relative to selected data tracks of the disc surface. The rotary actuator is operated via a voice coil motor operably coupled to the actuator block. Typically, the voice coil motor includes a voice coil coupled to the actuator block and a magnet-and-backiron structure coupled to the chassis of the disc drive for providing a permanent magnetic field for operation of the voice coil motor. Current is supplied to the coil of the voice coil to move the voice coil motor within the magnetic field formed by the magnet-and-backiron structure.

The actuator block is rotationally coupled to the chassis via a bearing cartridge in a known manner. Operation of the voice coil motor is controlled via control circuitry of the disc drive. Current is supplied to the voice coil motor to rotate the actuator block for placement of the heads relative to selected data tracks. Disc drive areal density is increasing such that precision head placement is required via operation of the voice coil motor. Additionally, there is an effort to provide faster seek times for positioning the heads to retrieve data. Structural dynamics of an actuator limit servo-bandwidth, thus limiting rejection of external disturbances, as well as degrading head placement during seek settle and track following modes. Thus, it is desirable to provide an actuator assembly capable of supporting high servo bandwidth for improved seek times and track following capability. The present invention addresses these and other problems, and offers other advantages over the prior art.

SUMMARY OF THE INVENTION

The present invention relates to an improved rotary actuator supporting heads relative to a disc surface for operation. The rotary actuator includes an actuator block pivotally connected to a base of a disc drive. The actuator block includes an actuator arm for supporting heads and supports a coil assembly adapted for operation in a magnetic field to form a voice coil motor. The coil assembly includes a plurality of wound coils supported by the actuator block at spaced elevations and having a portion of the spaced coils overlapped to reduce the operating area for the voice coil motor.

DETAILED DESCRIPTION OF THE PREFERRED EMBODIMENTS

Figure 1:
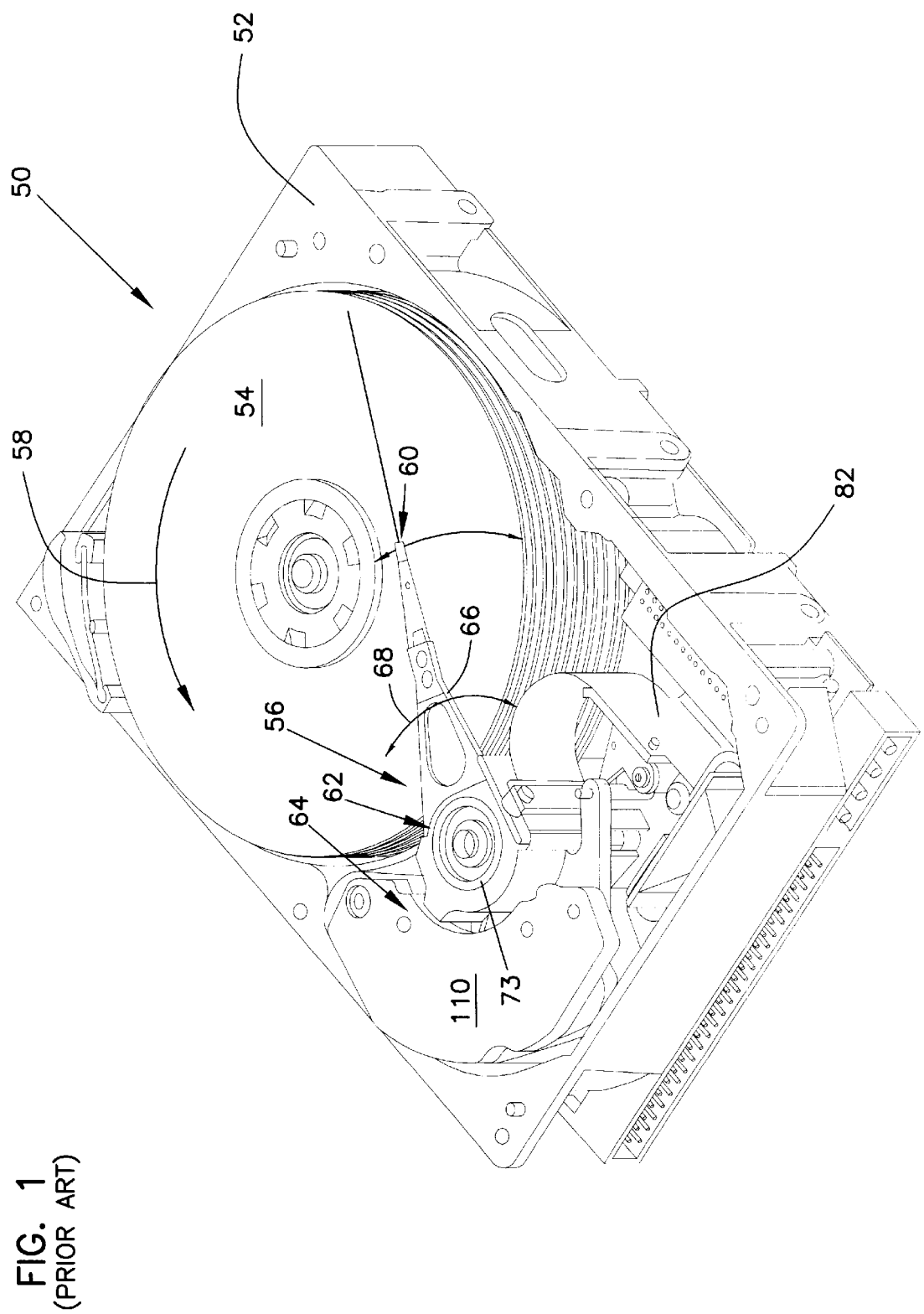
FIG. 1 is a perspective view of a disc drive illustrating a rotary actuator.

The present invention relates to an improved actuator assembly for head placement. The present invention has application for a rotary-type magnetic disc drive, as illustrated in FIG. 1. As illustrated, disc drive 50 includes deck 52, discs 54, and actuator assembly 56. Discs 54 are rotationally coupled to deck 52 via a spindle motor (not shown) for rotation, as illustrated by arrow 58. Actuator assembly 56 rotationally supports heads 60 for reading and writing data to and from discs 54. The actuator assembly includes actuator block 62 and voice coil motor (VCM) 64. As shown, actuator block 62 is rotationally coupled to deck 52. The actuator block 62 includes a plurality of actuator arms 66 (only one shown in FIG. 1) to support heads 60 relative to the disc surface. The actuator block rotates as illustrated by arrow 68 to move heads 60 along an arcuate path for placement relative to data tracks of a disc 54. Movement of the actuator block 62 is controlled by voice coil motor 64, which is coupled to control circuitry of the disc drive.

Figure 2:
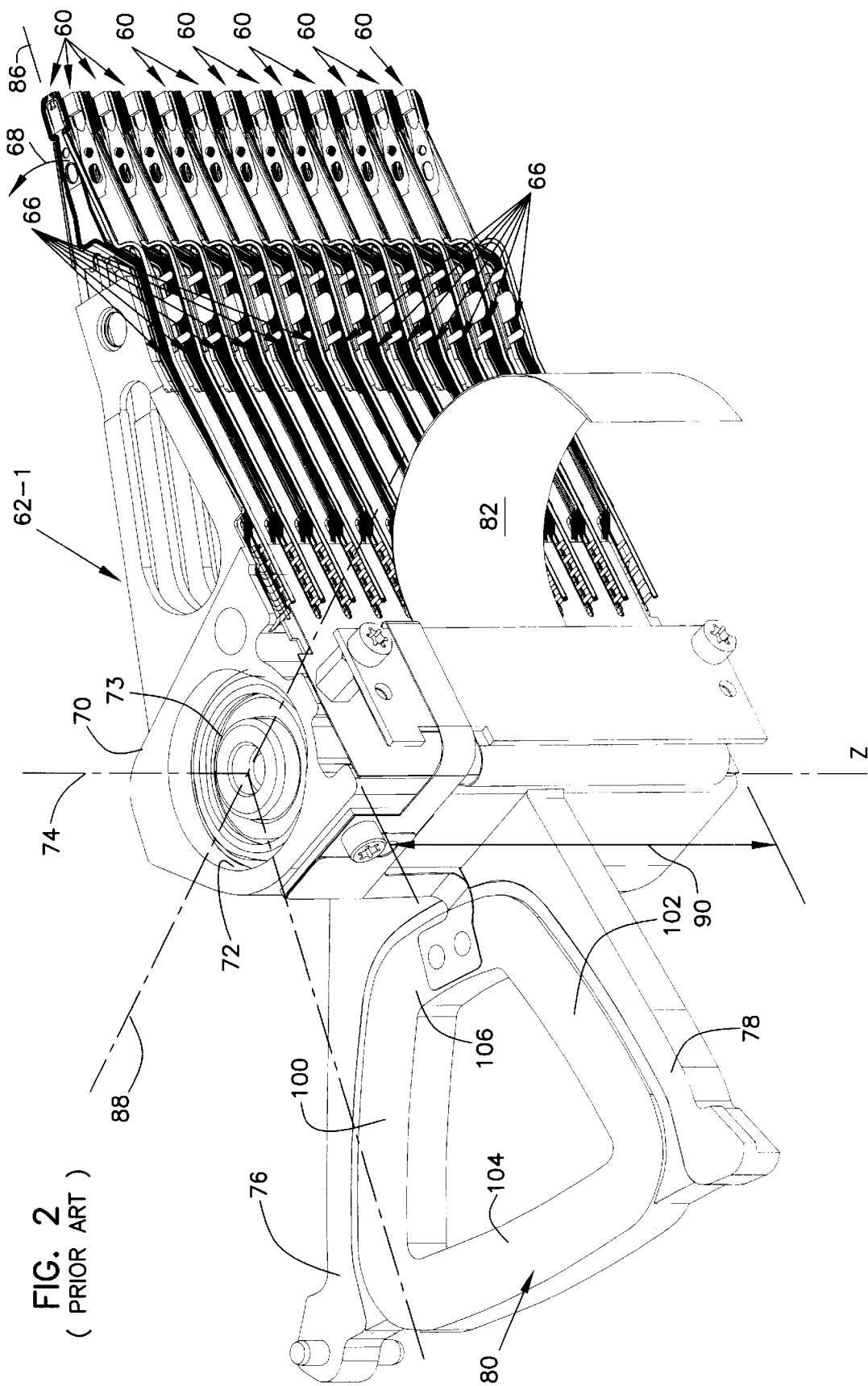
FIG. 2 is a perspective view of a rotary actuator of the prior art.
Figure 3:
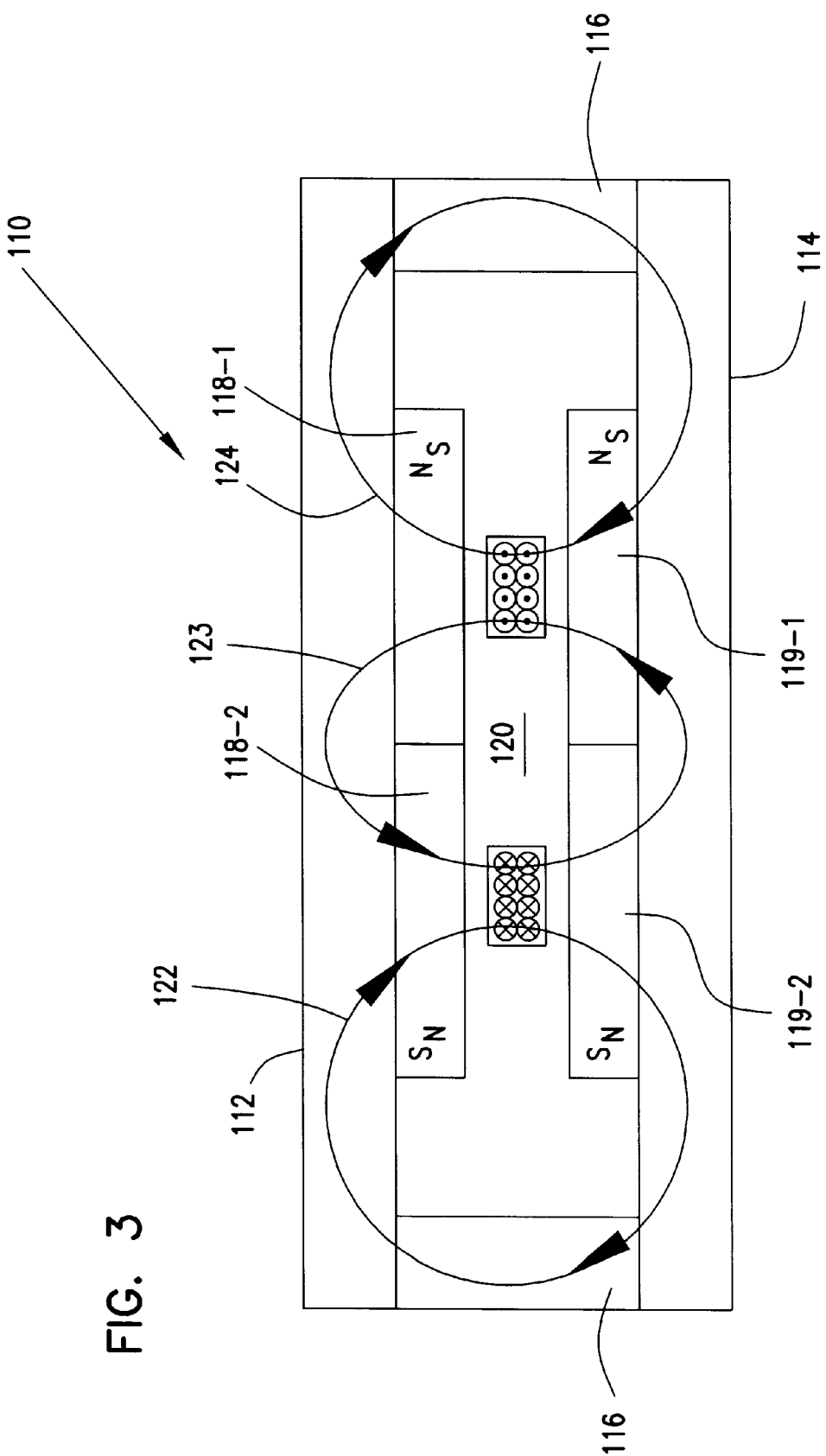
FIG. 3 is an illustrative view of a magnet-and-backiron assembly of a voice coil motor.

FIGS. 2 and 3 illustrate an embodiment of a traditional actuator block 62-1 of the prior art. As shown, actuator block 62-1 includes main body portion 70, which includes a bearing bore 72. Bearing cartridge 73 extends through bearing bore 72 to rotationally couple actuator block 62-1 relative to deck 52 of the disc drive. Thus, the bearing cartridge 73 defines a rotation or pivot axis 74 of the actuator block. The main body portion 70 includes rigid yokes 76, 78, which are formed to and radially extend from the main body portion 70. A wound coil 80 is coupled to yokes 76, 78. Coil 80 forms a portion of voice coil motor 64, as will be explained. Heads 60 carry transducer elements (not shown) and are coupled to flex circuit 82 to couple to circuitry of the disc drive for read and write operations.

As shown, the longitudinal extent of actuator arms 66 is aligned along a longitudinal axis 86, aligned with rotation axis 74. A transverse axis 88 extends perpendicular to the longitudinal axis 86. For simplicity, longitudinal axis 86 will be referred to as the "-x-" axis, and transverse axis 88 will be referred to as the "-y-" axis. The height or elevation 90 of the actuator block 62-1 coincides with the z-axis. As actuator block 62-1 rotates about axis 74, heads 60 move laterally relative to the longitudinal axis along an arcuate path relative to selected data tracks.

Coil 80 is supported between radial yokes 76, 78 and is generally wound in a flat pie-shaped trapezoidal configuration. The trapezoidal configuration includes sloped active coil legs 100, 102 extending radially outwardly at a sloped angle relative to the -x- and -y- axis to connect between opposed ends of transverse legs 104, 106. Coil 80 is coupled to a magnet-and-backiron assembly 110 illustrated in FIG. 1 to form a rotor of the VCM 64 as will be explained to rotate actuator block 62-1 about the pivot point.

FIG. 3 is a cross-sectional view of an embodiment of magnet-and-backiron assembly 110 which provides a permanent magnetic flux field for operation of the VCM 64. As shown, assembly 110 includes spaced backirons 112, 114, which are supported in spaced relation via spacers 116. Backirons 112, 114 include permanent magnets coupled thereto. As shown, backiron 112 supports magnets 118-1, 118-2 and backiron 114 supports magnets 119-1, 119-2. Magnets 118-1, 118-2 and magnets 119-1, 119-2 each cooperatively form bipolar charged magnet assemblies supported via backirons 112, 114. Although multiple magnets 118-1, 118-2 and magnets 119-1, 119-2 are shown, alternative magnet assemblies may be formed of a single bipolar charged magnet. A spaced relation between the magnets 118-1, 118-2 and 119-1, 119-2 defines air gap 120. Coil 80 (i.e. active coil legs 100, 102) extends into and operates in air gap 120.

A permanent magnetic field is produced by the magnets which is carried through the backirons 112, 114 and spacers 116 and focussed through air gap 120. Arrows 122, 123, 124 show the flux path of the magnetic circuit. Current is supplied to coil 80 for operation of the voice coil motor. Legs 100 and 102 are aligned in the flux path to generate force in legs 100, 102 based upon:

$$F = il n \times B \qquad \text{Eq. 1}$$

where:
F—is the force generated;
i—is the current through the coil;
l—is the active length of legs 100, 102 of the coil;
B—is the magnetic field; and
n—is the number of turns in the coil.

The operation force rotates actuator block 62-1 about rotation axis 74 or pivot point. The direction of rotation depends upon the direction of the current and the direction of the magnetic flux field.

Figure 4:
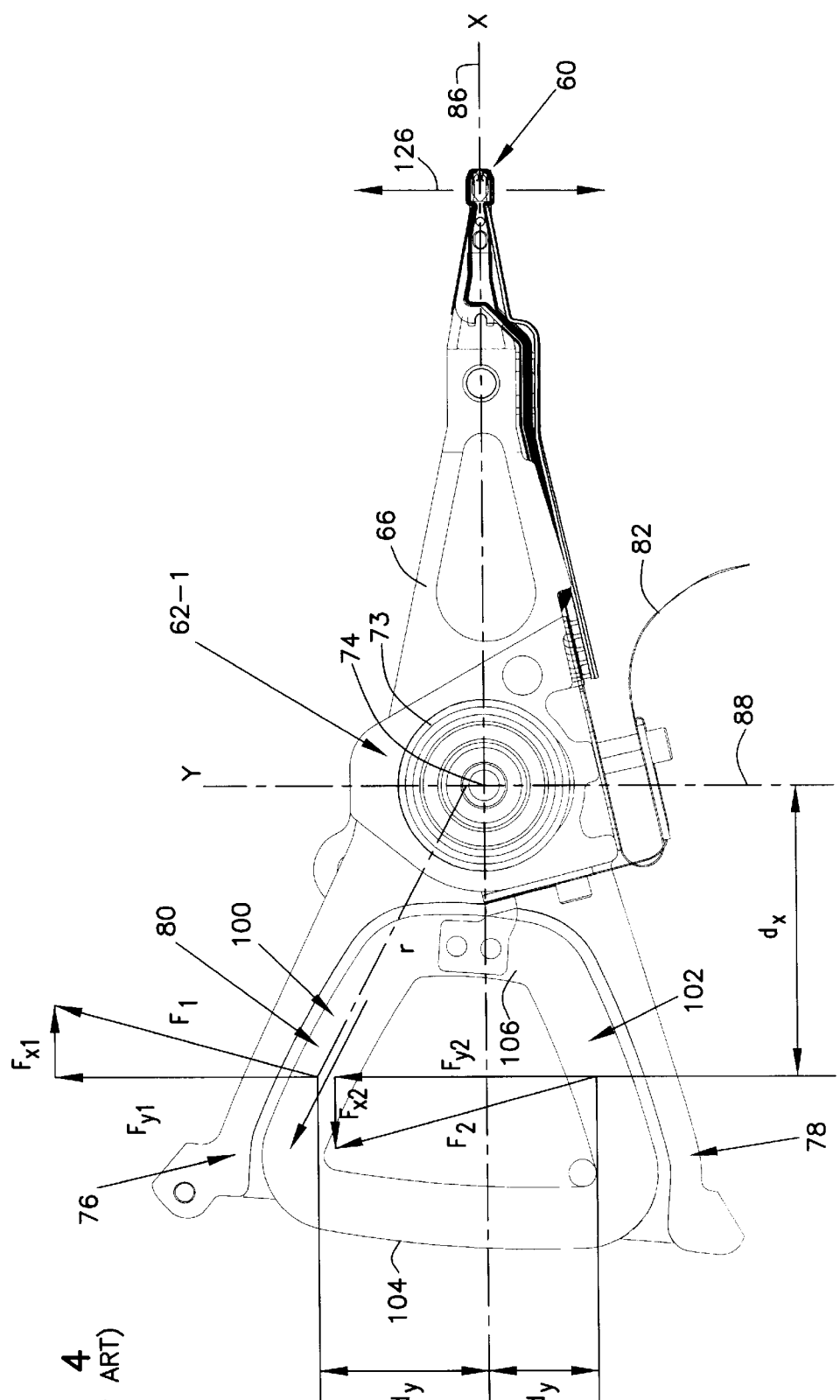
FIG. 4 is a top plan view of a rotary actuator of the prior art.

As illustrated in FIG. 4, the generated force F is generally perpendicular to each coil leg in a direction dependent upon the direction of the flux path and current. As shown, $F_1$ is the force on leg 100. $F_2$ is the force on leg 102. As shown, $F_1$ and $F_2$ generated in legs 100, 102 have an $F_x$ component of force and an $F_y$ component of force to move head 60 along an arcuate path as illustrated by arrow 126 for head placement relative to selected data tracks. The $F_x$ component of force generated in legs 100, 102 provides an "on-track" force to rotate the actuator block 62-1. "On-track" refers to a force along the longitudinal axis 86 generally perpendicular to the movement of the head 60 as illustrated by arrow 126. The "on-track" force in legs 100, 102 are balanced or directed in opposite directions as will be explained.

The $F_y$ force component is an "off-track" force. Off-track refers to force along the axis of movement of the heads in the direction of arrow 126. The "off-track" force in legs 100, 102 is additive as will be explained. As shown, $F_{x1}$, $F_{x2}$ and $F_{y1}$, and $F_{y2}$ provide torque for operation of the VCM 64 to rotate the actuator block 62-1. Torque produced is provided as follows $$T = F_{y1}(dx) + F_{y2}(dx) + F_{x1}(dy) + F_{x2}(dy) \qquad \text{Eq. 2}$$

where:

$F_{x1}$, $F_{x2}$, $F_{y1}$, $F_{y2}$—are the force components generated in coil legs 100, 102;
dx—is the on-track axis distance from pivot point to coil legs 100, 102 defining the $F_y$ moment arm; and
dy—is the off-track axis distance from the pivot point to coil legs 100, 102 defining the $F_x$ moment arm.

$F_x$ and $F_y$ (i.e on-track and off-track force) excite the actuator block 62-1 which excites the rigid body resonance of the actuator block 62-1. The $F_x$ and $F_y$ excitation imparted to the actuator block 62-1 is provided as follows:

$F_x$ component of force equals:

$$F_x = F_{x1} + F_{x2} \qquad \text{Eq. 3}$$

Since $F_{x1}$ and $F_{x2}$ are directed in opposite directions: $F_x = F_{x1} + (-F_{x2})$ or $F_x = 0$ Eq. 3

$F_y$ component of force equals:

$$F_y = F_{y1} + F_{y2} \qquad \text{Eq. 4}$$

Since $F_{y1}$ and $F_{y2}$ are directed in the same direction, the $F_y$ force components are additive. The additive $F_y$ force components introduce a relatively large off-track force. The large "off-track" force excites the rigid body resonance or "off-track" resonance increasing seek settle times for the actuator block 62-1 and heads 60. In particular, the actuator assembly (actuator block 62-1, bearing cartridge 73) is a rigid body which resonates or vibrates when excited by external forces because of the mass of the actuator and spring constant of the supporting bearings. The large excitation or resonance in the off-track direction (i.e. parallel to arrow 126) limits seek settle times and servo-bandwidth.

To compensate for the off-axis force bearing stiffness can be increased; however, increased bearing stiffness results in increased bias or hysteresis which degrades settle in on track. Furthermore, it is not possible to significantly increase stiffness due to space constraints. The present invention relates to an actuator assembly which reduces off-track force to reduce excitation of the rigid body resonance, while maintaining desired torque output for operation of the actuator block. The actuator assembly of the present invention reduces off-track excitation to improve seek settle times and fits within the defined form factors for a disc drive and provides a desired head stroke, and swing arm length, as will be explained.

Figure 5:
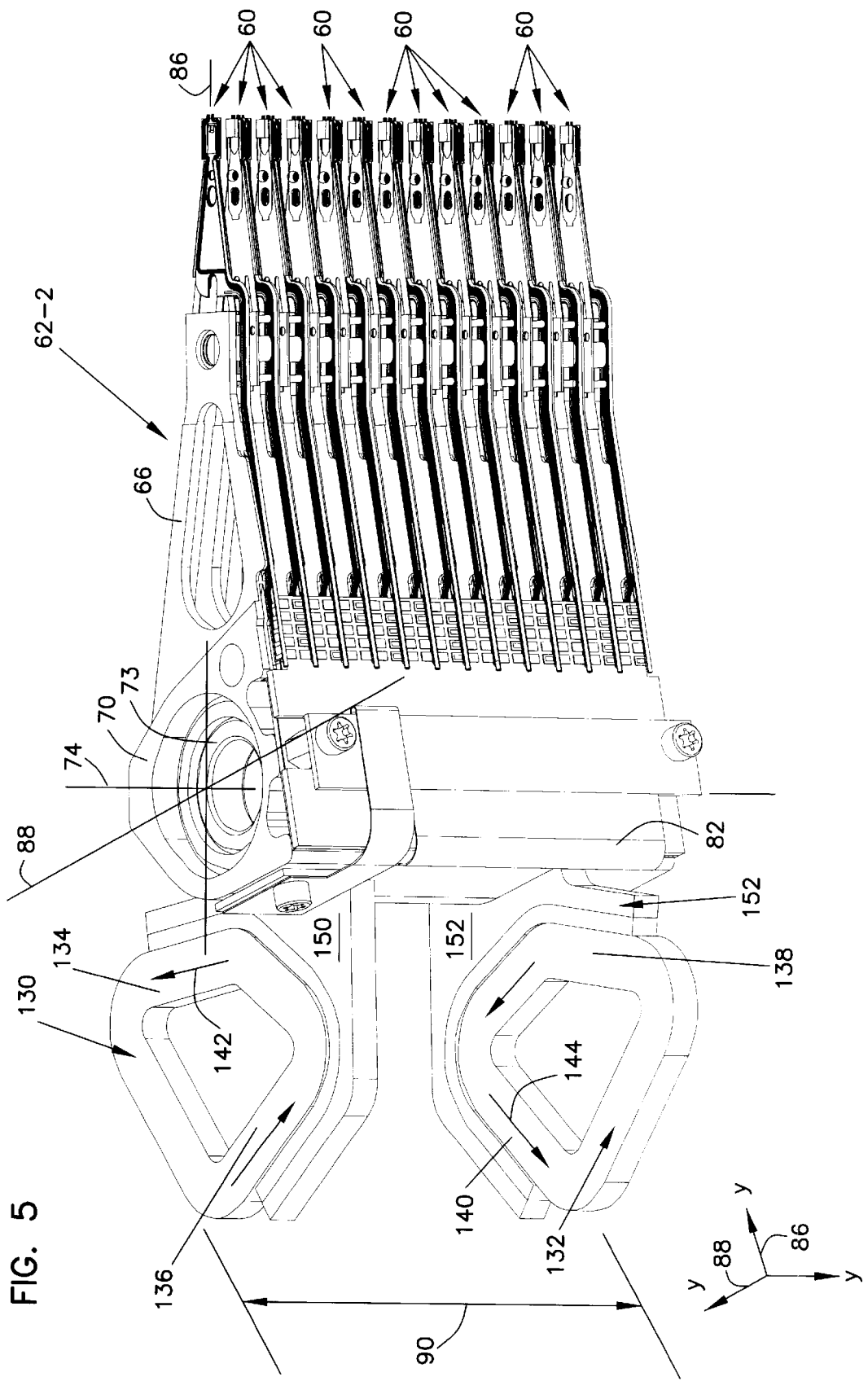
FIG. 5 is a perspective view of an embodiment of a rotary actuator of the present invention.

FIG. 5 illustrates an embodiment of an actuator assembly of the present invention including actuator block 62-2, where like numbers are used to refer to like parts of the previous FIGS. As shown, actuator block 62-2 includes multiple coils 130, 132 which form the rotor of VCM 64. The coils 130, 132 are designed to limit off-track $F_y$ force without sacrificing applied torque to reduce actuation of the actuator rigid body resonance for increased bandwidth. As shown, coil 130 includes spaced active coil legs 134, 136 arranged in a relatively flat wound coil loop; and coil 132 includes active spaced coil legs 138, 140 arranged in a flat wound coil loop. The coils are wired for unidirectional current flow as illustrated by arrows 142, 144.

Figure 6:
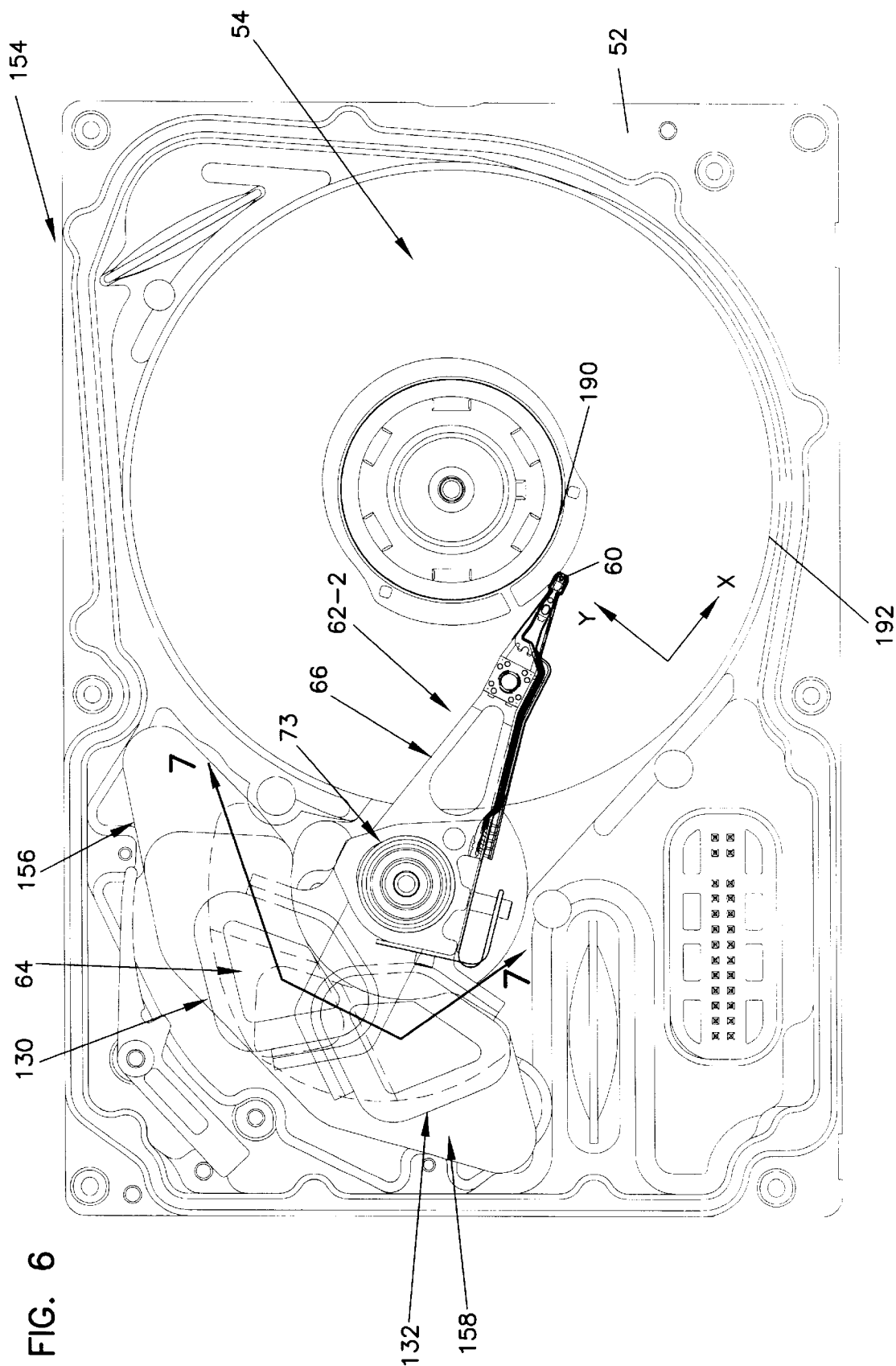
FIG. 6 is a top plan view of a disc drive incorporating the rotary actuator of FIG. 5.

The multiple coils 130, 132 are supported relative to main body portion 70 in spaced stacked relation at spaced z-axis elevations. In particular, the multiple coils 130, 132 are supported via spaced upper and lower cradles 150, 152 and are staggered and symmetric or mirrored relative to a center axis of the coil assembly to provide a balanced weight for the actuator block. Coil assembly is offset from the longitudinal axis 86 to compensate or balance the weight of operation circuitry 82. As shown in FIG. 6, actuator block 62-2 is supported for operation in disc drive 154, where like numbers are used to identify like parts.

Figure 7:
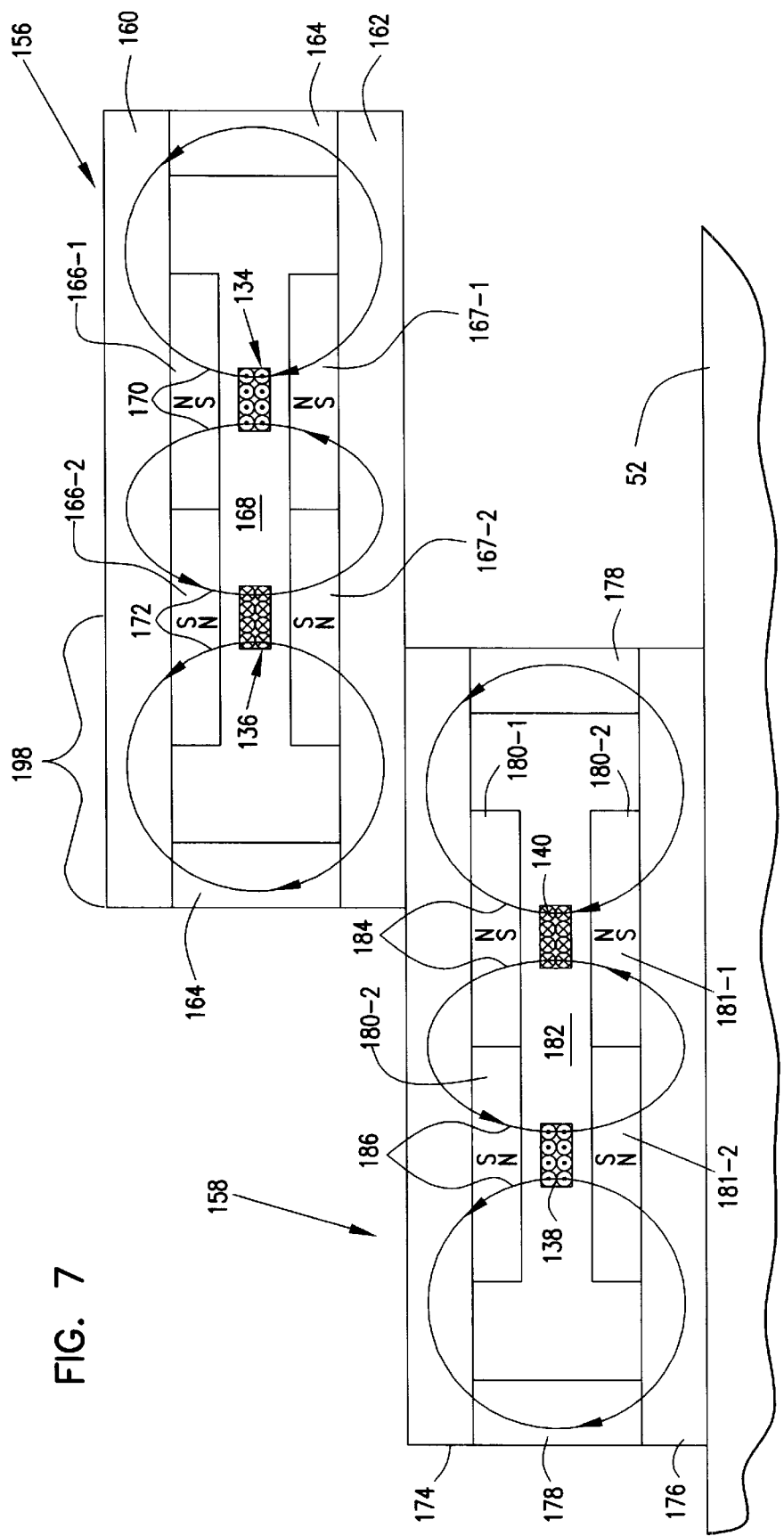
FIG. 7 is a cross-sectional view taken along lines 7—7 of FIG. 6.

Coils 130, 132 are aligned with stacked magnet-and-backiron assemblies 156, 158 forming permanent magnetic fields to form the VCM. FIG. 7 is a cross-sectional view of magnet-and-backiron assemblies 156, 158 as taken along line 7—7 of FIG. 6. As shown, magnet-and-backiron assembly 156 includes spaced backirons 160, 162 supported via spacers 164. Backirons 160, 162 support magnets 166-1, 166-2 and 167-1, 167-2, respectively to form air gap 168 having opposed magnetic fields 170, 172. Magnet-and-backiron assembly 158 includes spaced backirons 174, 176 supported via spacers 178. Backirons 174, 176 support magnets 180-1, 180-2 and 181-1, 181-2, respectively to form air gap 182 having opposed magnetic fields 184, 186.

Figure 8:
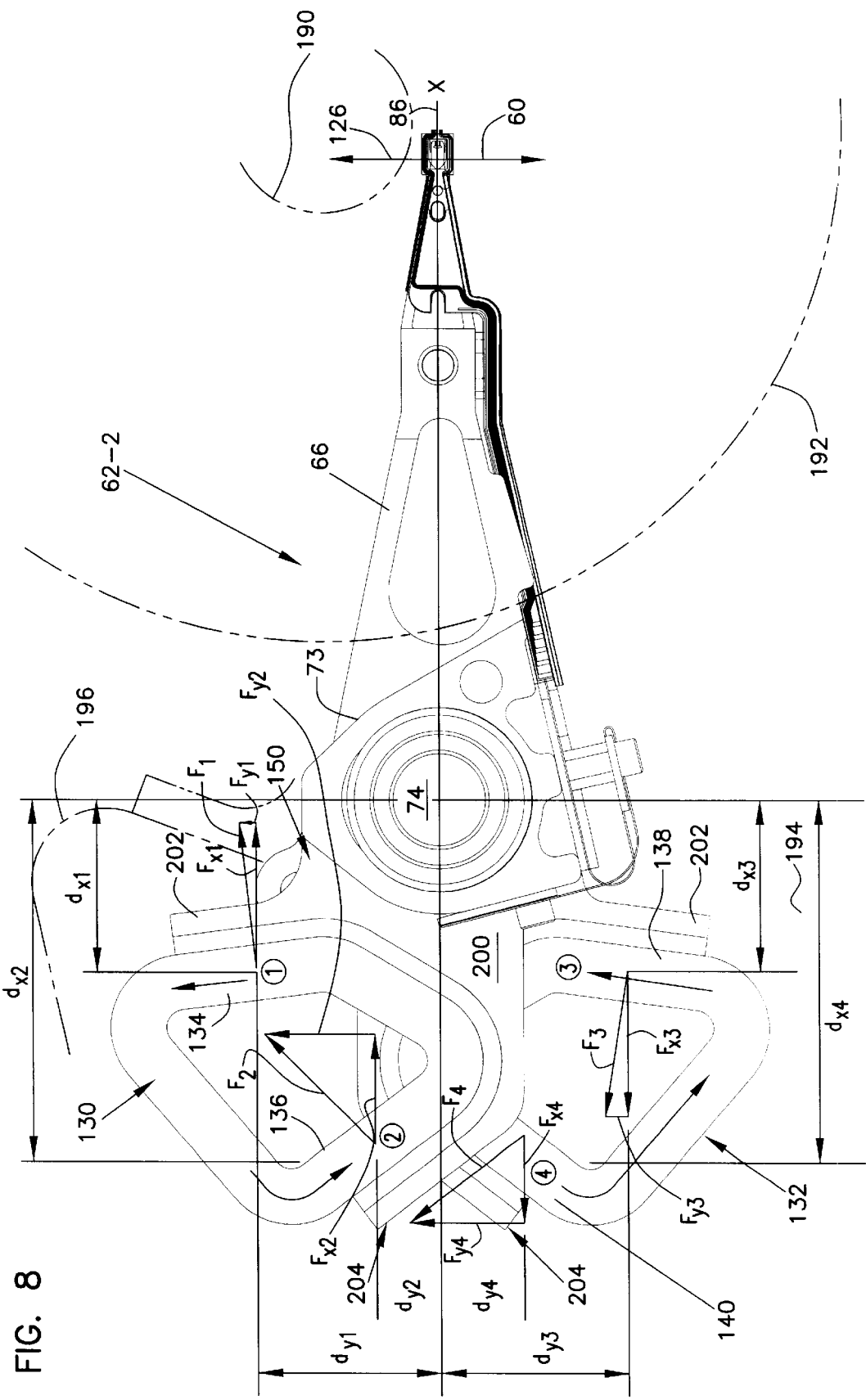
FIG. 8 is a top plan view of the actuator of FIG. 5 illustrating force components generated by current flowing through the coils for operation of a voice coil motor.

Magnet-and-backiron assemblies 156, 158 are coupled to deck 52 of the disc drive 154 and are supported in stacked relation at different z-axis elevations and are staggered relative to the longitudinal axis to align air gaps 168, 182 with coils 130, 132, respectively. As shown in FIG. 8, coil legs 134 and 138 of coils 130, 132 are staggered relative to the longitudinal axis (i.e. mirrored about a center axis of the coil assembly) and extend generally transverse to the longitudinal axis. The magnet-and-backiron assemblies are arranged so that transverse legs 134, 138 having a similar current flow direction operate in oppositely directed magnetic flux fields to rotate actuator block. Coil legs 136, 140 are staggered relative to the longitudinal axis and legs 136, 140, having a similar current flow direction operate in oppositely directed magnetic flux fields to rotate the actuator block as illustrated in FIG. 8 as follows.

$$T=F_{x1}(d_{y1})+F_{x2}(d_{y2})+F_{x3}(d_{y3})+F_{x4}(d_{y4})+F_{y1}(d_{x1})+F_{y2}(d_{x2})+F_{y3}(d_{x3})+F_{y4}(d_{x4}) \quad \text{Eq. 5}$$

As shown, active coil legs 134 and 138 generally extend transverse to the x-axis and coil legs 136, 140 are sloped relative to the x–y axis. The transverse coil legs 134, 138 provide a significantly greater $F_x$ or on-axis force component and a relatively small $F_y$ or off-axis force component which is imparted to the actuator block as a result of operation of the VCM. Active coil legs 136, 140 provide both an $F_x$ or on-axis force component and an $F_y$ or off-axis force component which is imparted to the actuator block. Thus as shown, Fx component of force equals:

$$F_x=F_{x1}+F_{x2}+F_{x3}+F_{x4} \quad \text{Eq. 6}$$

Since $F_{x1}$ and $F_{x2}$; and $F_{x3}$ and $F_{x4}$ are directed in opposite directions:

$$F_x=0 \quad \text{Eq. 7}$$

The $F_y$ component of force equals:

$$F_y=F_{y1}+F_{y2}+F_{y3}+F_{y4} \quad \text{Eq. 8}$$

Since $F_{y1}$, and $F_{y3}$ are almost eliminated, when compared to the legs of the prior art shown in FIG. 2 and $F_{y2}$ and $F_{y4}$ are substantially reduced compared to the legs of the coil of the prior art shown in FIG. 2. In an embodiment shown, the overall off-track force is reduced by 60% compared to the coil design of the prior art illustrated in FIG. 2. Thus, the off-track force $F_y$ of the coil voice coil motor of the present invention is reduced while maintaining desired torque output thus reducing off-track excitation of the actuator assembly.

As explained, the VCM of the present invention includes multiple coils. Since multiple coils are used, each coils 130, 132 is smaller and has fewer turns to produce the torque magnitude of a single coil VCM. The smaller multiple coils 130, 132 combined in series have a lower overall inductance than a single large coil as illustrated in FIG. 2, since inductance is proportional to:

$$L \approx n^2 a \quad \text{Eq. 9}$$

where:

L—is the inductance;

n—is the number of coil turns; and a—is the area enclosed by the coil.

Theoretically, for a multiple coil VCM, as described, having approximately half (½) the turns of a conventional single coil VCM and an enclosed area of approximately half (½) the area of a conventional single coil VCM, the inductance can be described as:

$$L \approx (n/2)^2(a/2)+(n/2)^2 a/2 = n^2 a/4 \quad \text{Eq. 10}$$

Thus the inductance of multiple coils having ½ the turns and ½ the enclosed area of a conventional single coil design is smaller since $L \approx n^2 a/4$ for a multiple coil design where $L \approx n^2 a$ for a conventional single coil design. The resistance of the multiple coils is approximately the same as a single coil VCM. For example, in an embodiment of a prior art coil as illustrated in FIG. 2 having 178 turns, the resistance is 5.7 ohms and inductance is measured at 850 mHenry. In an embodiment of a dual coil VCM of the present invention as illustrated in FIG. 5, where each coil has 120 turns for a total number of turns of 240, the combined inductance of the two coils is 550 mHenry and the total resistance is 6.10 ohms. Thus, there is approximately a 35% reduction in inductance between the prior art embodiment and the embodiment of the present invention.

Figure 9:
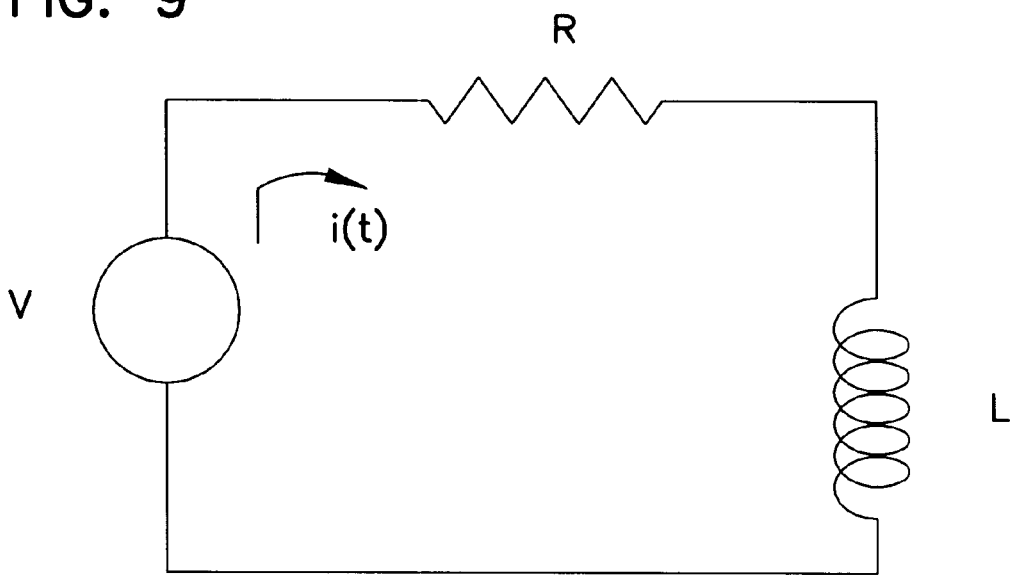
FIG. 9 is a illustration of an L-R circuit.
Figure 10:
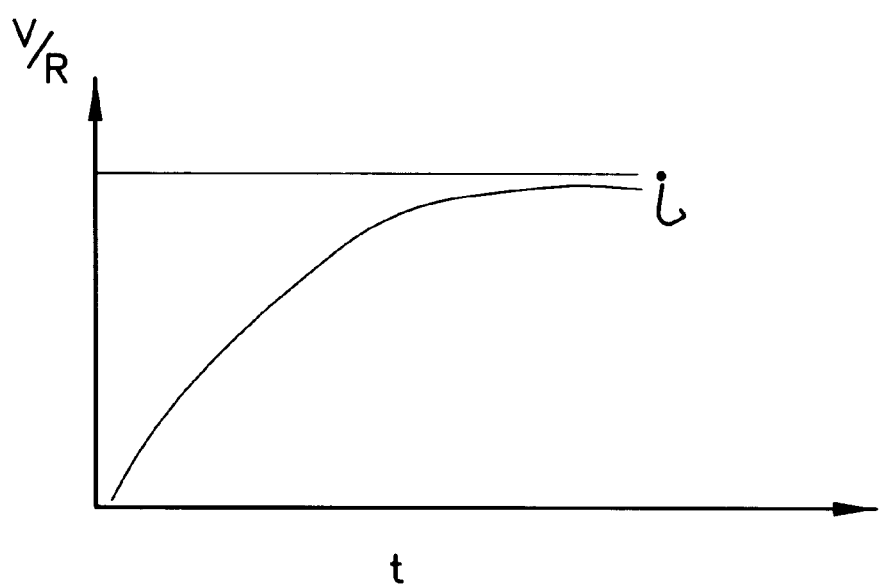
FIG. 10 is a graphical illustration of the current as a function of time for the L-R circuit of FIG. 9.

If we model the voice coil circuit as an L (inductance) - R (resistance) circuit as illustrated in FIG. 9, the current profile as illustrated in FIG. 10 for a voltage applied across the coil can be described as:

$$i(t)=V/R[1-e^{-(R/L)t}] \quad \text{Eq. 11}$$

where L/R is defined as the time constant of the L-R circuit. Lower time constants allow the current to rise faster. Ultimately seek times are improved since torque T is proportional to current i. Thus the time constant of the multi-coil VCM is smaller than that of a single conventional coil since R is the same and L is smaller for the multi-coil than the single coil. Thus the smaller time constant for the multi-coil design relative to the single coil design provides faster seek times.

As shown in FIGS. 6 and 7, the multiple coils 130, 132 rotate in air gaps 168, 182 to position head 60 supported by actuator block 62-2 generally between an inner diameter ID 190 and an outer diameter OD 192. Coils 130, 132 rotate a sufficient head stroke distance for placement of heads between ID 190 and OD 192. The x–y planar dimension of the multiple coils and x–y stroke area for placement of the heads between ID 190 and OD 192 defines the operating area or zone of the VCM. In particular, as illustrated in FIG. 8, as the actuator block 62-2 is positioned for head 60 placement relative to the ID 190. As actuator block 62-2 rotates for head 60 placement relative to the OD 192, the coil assembly rotates a stroke distance in a direction illustrated by phantom boundary line 196. Thus, the area required for operation includes the x–y planar dimension of the coils 130, 132 and stroke distance to phantom boundary line 196.

Disc drive size is decreasing for enhanced portable and space limitations thus reducing the available operating zone or area of the VCM. Longer actuator arms may be used to decrease stroke distance of coils to reduce the operating area of the VCM, however longer actuator arms degrade the resonance characteristics and increase inertia of the actuator block 62-2. In the VCM of the present invention, multiple coils are stacked at spaced z-axis elevations. A portion of the multiple coils 130, 132 overlap in the x–y plane to reduce the x–y plane operating area dimension of the VCM. The overlapping relation reduces the operating area or zone of the VCM to reduce the effective area required to operate heads between ID 190 and OD 192 of discs without increasing swing arm length (i.e. the length of actuator arm 66).

The coils operate in multiple stacked magnet and backiron assemblies 156, 158. As shown in FIG. 7, the magnet and backiron assemblies 156, 158 are supported at different -z-axis elevations and a portion 198 of assemblies 156, 158 overlap such that backiron 162 lays onto backiron 174 so that air gaps 168, 182 align with overlapping coils 130, 132. The upper and lower cradles 150, 152 are arranged to support coils 130, 132 so that a portion of the coils 130, 132 have an overlapping portion to reduce the overall x–y operating zone area. As shown in FIG. 8, upper and lower cradles 150, 152 include base 200 and arms 202, 204. Bases 200 are coupled to actuator block 62-2 at spaced elevations; and arms 202, 204 extend therefrom. Arms 202 extend transverse to the longitudinal axis to support transverse legs 134, 138 of coils 130, 132 attached thereto. Arms 204 are coupled to bases 200 and extend outwardly at a sloped angle from the longitudinal axis 86 to support active coil legs 136, 140. Legs 134, 138 of coils 130, 132 are coupled to arms 202 of cradles 150, 152 and legs of coils 136, 140 are coupled to arms 204 of cradles 150, 152 via gluing and other known conventional methods.

It is to be understood that even though numerous characteristics and advantages of various embodiments of the present invention have been set forth in the foregoing description, together with details of the structure and function of various embodiments of the invention, this disclosure is illustrative only; and changes may be made in detail, especially in matters of structure and arrangement of parts, within the principles of the present invention to the full extent indicated by the broad general meaning of the terms in which the appended claims are expressed. For example, the particular design of the dual-coils may vary, depending upon the particular application, while maintaining substantially the same functionality and without departing from the scope and spirit of the present invention. In addition, although the preferred embodiment shown herein is directed to a magnetic-type data storage system, it will be appreciated by those skilled in the art that the teachings of the present invention can be applied to other systems, such as an optical data storage system, for example, without departing from the scope and spirit of the present invention.

What is claimed is:

1. An actuator for a disc drive comprising:
   an actuator block formed of a rigid member having an elevated extent and including an actuator arm extending along a longitudinal axis transverse to the elevated extent, the actuator arm being adapted to support a head, the elevated extent being aligned parallel to a rotation axis of the actuator block; and
   a coil assembly coupled to the actuator block and adapted for operation in a magnetic field to form a voice coil motor, said coil assembly including a plurality of wound coils supported by the actuator block at spaced elevations and having a portion of the spaced coils overlapped to reduce the operating area for the voice coil motor.

2. The actuator of claim 1 wherein coils of the coil assembly include at least one coil portion extending in a direction generally transverse to the longitudinal axis.

3. The actuator of claim 1 wherein the coil assembly includes upper and lower coils supported by upper and lower cradles coupled to the actuator block at spaced elevations.

4. The actuator of claim 1 wherein the coils are staggered relative to the longitudinal axis.

5. The actuator of claim 1 wherein the coils are mirrored about a center axis.

6. The actuator of claim 1 wherein the plurality of wound coils are formed of a continuous coil wired in series.

7. The actuator of claim 6 wherein the coils are wired so that current flows in a uniform direction.

8. The actuator of claim 1 wherein the coils are generally trapezoidal shaped.

9. A disc drive comprising:
   a chassis;
   a disc rotationally coupled to the chassis;
   means for rotating the disc for operation;
   an actuator block formed of a rigid member having an elevated extent and including an actuator arm extending along a longitudinal axis transverse to the elevated extent, the actuator arm being adapted to support a head, the elevated extent being aligned parallel to a rotation axis of the actuator block; and
   a coil assembly coupled to the actuator block and adapted for operation in a magnetic field to form a voice coil motor, said coil assembly including a plurality of wound coils supported by the actuator block at spaced elevations and having a portion of the spaced coils overlapped to reduce the operating area for the voice coil motor; and
   magnet assemblies having air gaps, said magnet assemblies being coupled to the chassis at spaced elevations aligned with coils for operation of the voice coil motor.

10. The disc drive of claim 9 wherein coils of the coil assembly include at least one coil portion extending in a direction generally transverse to the longitudinal axis.

11. The disc drive of claim 9 wherein the coil assembly includes upper and lower coils supported by upper and lower cradles coupled to the actuator block at spaced elevations.

12. The disc drive of claim 9 wherein the coils are staggered relative to the longitudinal axis.

13. The disc drive of claim 9 wherein the coils are symmetric relative to the longitudinal axis.

14. The disc drive of claim 9 wherein the plurality of wound coils are formed of a continuous coil wired in series.

15. The disc drive of claim 14 wherein the coils are wired so that current flows in a uniform direction.

16. The disc drive of claim 9 wherein the coils are generally trapezoidal shaped.

17. The disc drive of claim 9 wherein a portion of the magnet assemblies overlap.

18. An actuator for a disc drive comprising:
   an actuator block formed of a rigid member having an elevated extent and including an actuator arm extending along a longitudinal axis transverse to the elevated extent, the actuator arm being adapted to support a head, the elevated extent being aligned parallel to a rotation axis of the actuator block;
   a coil assembly coupled to the actuator block and adapted for operation in a magnetic field to form a voice coil motor, said coil assembly including
   a plurality of wound coils; and
   means for supporting the coils relative to the actuator block to limit off-track force imparted to the head supported by the actuator block.

* * * * *